Jan. 3, 1967  W. A. O'BANNON, JR., ET AL  3,295,822
BLIND VALVE CAGE AND METHOD OF MAKING SAME
Filed Dec. 16, 1963  2 Sheets-Sheet 1

INVENTORS:
WILLIAM R. BRADLEY, JR.
WALTER A. O'BANNON, JR.

BY *Head & Johnson*
ATTORNEYS

Jan. 3, 1967   W. A. O'BANNON, JR., ETAL   3,295,822
BLIND VALVE CAGE AND METHOD OF MAKING SAME
Filed Dec. 16, 1963   2 Sheets-Sheet 2

INVENTORS:
WILLIAM R. BRADLEY, JR.
WALTER A. O'BANNON, JR.

BY Head & Johnson
ATTORNEYS

Patent 3,295,822 — Blind Valve Cage and Method of Making Same

3,295,822
BLIND VALVE CAGE AND METHOD OF MAKING SAME
Walter A. O'Bannon, Jr., and William R. Bradley, Jr., Tulsa, Okla., assignors to Walter O'Bannon Company, Tulsa, Okla., a corporation of Delaware
Filed Dec. 16, 1963, Ser. No. 330,742
17 Claims. (Cl. 251—366)

This invention relates to valves and more particularly to a closed valve cage and method of making same.

Ball valves have long been in use and fined particular applicability in well pumping installations. These ball valves conventionally consist of a ball and an annular seat positioned within a closed cage. The valve cages are commonly provided internally with a plurality of longitudinally extending annularly spaced ribs for guiding the ball valve into and out of sealing relation with the valve seat. The longitudinally extending grooves between adjacent guide ribs function as fluid flow by-pass passages to accommodate fluid flow througth the valve cage when the valve is in the open position. These ribs are subject to rapid deterioration due to the movement of the ball, especially when the valves are positioned as integral parts of a downhole pump. When these guide ribs become worn, the ball is allowed to strike the top surface of the seat unevenly outside of complete sealing contact causing damage to the seat and/or ball which often results in development of a leak across the seat necessitating replacement of the valve.

It is necessary to provide a stop in the passage through the valve cage to limit the movement of the valve ball as it moves out of sealing engagement with the valve seat to prevent its being displaced out of the valve cage. When the flow passages through the valve cage are relatively small, a high flow rate through the valve cage will result. This high flow rate causes the valve ball to be displaced in the direction of the stop at a relatively high rate of speed. Therefore, when the ball collides with the stop, serious damage often results to the ball and/or stop.

When using valves of this type in a downhole pump positioned in relatively deep wells, a high pressure differential usually exists across the wall of the valve cage due to the high hydrostatic pressure of the fluid being pumped thereby. Therefore, it is necessary that the valve cage wall be of maximum thickness to withstand this pressure differential. Since these valves are commonly positioned in the relatively small diameter of the subsurface pump barrel, the size of the valve cage is limited. Therefore, it has, with prior known methods, been difficult to produce a ball valve cage that is externally small enough to fit within the small diameter pump barrel, that possesses sufficient wall strength to withstand the relatively high downhole pressures, and has sufficiently large fluid by-pass passages that the flow rate through the cage will not be so high as to cause serious high speed collision between the valve ball and the stop provided in the passage through the valve cage.

It is necessary to the operation of a ball valve of the type above described that an internally upset annular shoulder be provided interiorly of the closed valve cage, against which an annular ball valve seat can be positioned. This shoulder is commonly produced by milling the by-pass passages in the wall of a section of the valve cage that is internally upset, thereby producing an internally upset shoulder. In producing this shoulder it is necessary to use special tools for the milling operation and the operation is difficult and very time consuming.

Therefore, it is an object of this invention to provide a strong durable closed valve cage and a method of making same.

Still another object of this invention is to provide a closed valve cage having improved internal ball guide ribs and improved fluid by-pass flow passages internally of the valve cage.

Yet another object of this invention is to provide a closed valve cage having improved strength characteristics to prevent wall failure when the cage wall is subjected to high pressure differentials.

A still further object of this invention is to provide a closed valve cage having relatively large fluid flow passages through the cage to prevent exceedingly high fluid flow rates through the cage when the valve is in the open position, thereby preventing the ball valve from being forced against the various parts of the cage at undesirably high speeds.

A still further object of this invention is to provide a closed valve cage having one or more internal flow passages therethrough, diverging upwardly and outwardly from the valve seat whereby the valve ball is slowed as it is moved upwardly into the open position by movement of fluid upwardly through the valve cage.

A further object of this invention is to provide a blind valve cage that has one or more internal evenly annularly spaced apart milled out grooves extending at an angle to the axis of the cage and that function as fluid by-pass passages through the cage when the ball valve is in the open position.

A further object of this invention is to provide a closed valve cage including an improved shoulder against which a valve seat can be positioned.

A still further object of this invention is to provide a method for making a closed valve cage of the above described character.

Another object of this invention is to provide a method for making a closed valve cage in which the fluid by-pass grooves provided internally of the cage, are easily produced by a simple drilling or milling operation without the requirement of special tools.

A further object of this invention is to provide a method for producing a closed valve cage wherein the internally upset annular shoulder against which the valve seat is pisitioned is produced by a simple welding operation thereby providing for the manufacture of a cage with a seating shoulder having metallurgical characteristics that may be the same as or in some instances different than those of the body of the cage, as desired by the manufacturer.

Further objects and advantages of this invention will be apparent from the following description and appended claims, reference being had to the accompanying drawings forming a part of the specification wherein like reference characters designate corresponding parts in the several views.

General description

In general, this invention consists of a unibody closed valve cage and method of making same, the cage consisting of a lower valve ball receiving portion having a bore extending axially therethrough and an upper portion having a bore extending therethrough, coaxial and communicating with and smaller in diameter than the bore through the lower portion. At least one longitudinally extending flute or groove, arcuate in transverse cross section, is provided in the interiorly exposed surface of the lower portion, terminating upwardly at a valve ball stop means located substantially at the juncture of the lower portion and the upper portion. An internal annular shoulder is provided at the bottom end of the groove for receiving thereagainst a ball valve seat. The axis of the groove inclines upwardly and outwardly with respect to the axis of the bore through the lower portion. That portion of the interiorly exposed surface of the bore throught the lower portion of the valve cage adjacent the groove serves as a ball valve guide surface.

Specific description

Figure 1:
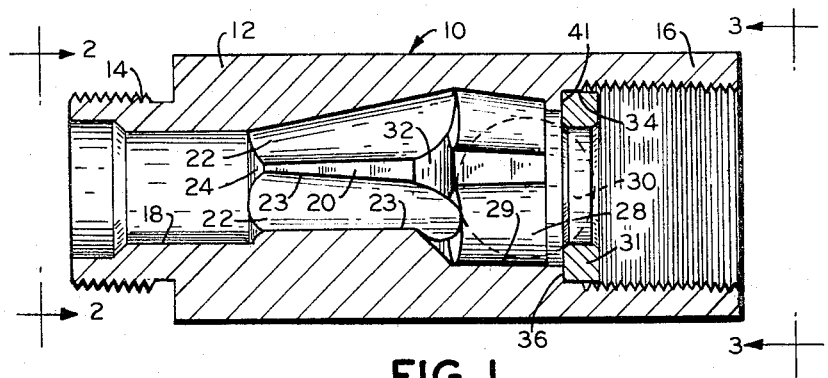
FIGURE 1 is a cross-sectional view of a ball valve and valve cage made according to this invention.
Figure 2:
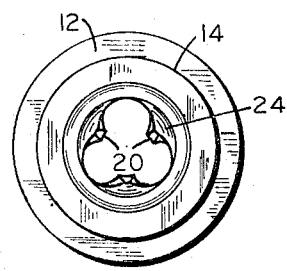
FIGURE 2 is an end view of the valve and valve cage of FIGURE 1.
Figure 3:
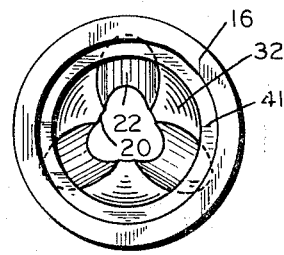
FIGURE 3 is an end view of the valve and valve cage of FIGURE 1.
Figure 6:
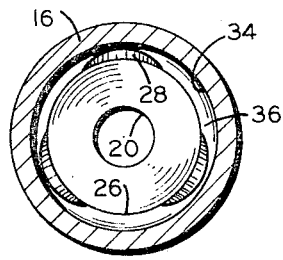
FIGURE 6 is a cross-sectional view taken along line 6—6 of FIGURE 5.
Figure 8:
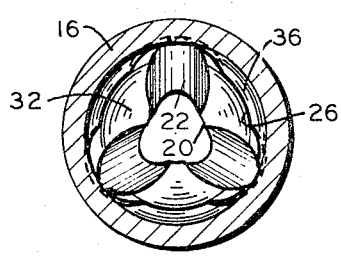
FIGURE 8 is a cross-sectional view taken along line 8—8 of FIGURE 7.

Referring now to the drawings in general, and specifically to FIGURES 1, 2, and 3, there is shown a ball valve and valve cage 10, made according to this invention. The tubular valve cage body 12 is typically provided on each end with means for connecting it into a fluid flow system such as a downhole pump, one means being a reduced diameter externally threaded first end portion 14 and an internally threaded second end portion 16. A passage 18 extends through end portion 14, partially into the cage body 12, terminating in counterbore 20. Counterbore 20 is preferably provided with three evenly annularly spaced grooved 22 that are arcuate in transverse cross section, with adjacent inwardly directed longitudinal ribs 23. Ribs 23 terminate upwardly (that is, to the left in FIGURE 1) in internal shoulders 24. The grooves 22 are preferably inclined downwardly and outwardly of the body 12, relative to the axis of counterbore 20.

Counterbore 20 terminates downwardly, at a point near the middle of the body 12, in an enlarged coaxially extending bore 26. Preferably, three longitudinally extending evenly annularly spaced inclined grooves 28 are provided in the interior wall of bore 26, forming internal longitudinal valve ball guide surfaces 29 therebetween. Grooves 28 are inclined upwardly and outwardly at an angle greater than 0° but not more than 20° relative to the axis of bore 26. Grooves 28 have the same annular spacing as grooves 22 in bore 20 and terminate upwardly in the bottom ends of grooves 22.

Grooved bore 26 is intended to receive therein a conventional valve ball 30 with surfaces 29 functioning as guide surfaces for ball 30 as the ball moves longitudinally within bore 26 into and out of closed position relative to valve seat 31. Grooves 28 function as by-pass fluid flow passages when the ball 30 is in the unsealed, open position.

Bores 20 and 26 join in a substantially frusto-conical shoulder that is cut by grooves 22 to form three internal shoulders 32 at the bottom extremities of ribs 23 that function as a stop to limit upward movement of ball 30. Since shoulders 32 are evenly spaced and beveled they will center the ball 30 and prevent rattling around which is common with conventional flat-type stop bridges.

When ball 30 is in its open position, against stop 32, grooves 22 and 28 cooperate to provide by-pass fluid flow passages past ball 30.

Grooved bore 26 terminates downwardly (that is, to the right in FIGURE 1) in enlarged bore 34. An annular shoulder 41 is provided internally of bore 34, adjacent to and below the bottom ends of grooves 28. Shoulder 41 is preferably machined or otherwise finished to a preferred smoothness and receives against the downwardly presented surface thereof a valve seat element 31.

Ball valve seat element 31 is positioned within bore 34 and retained against the shoulder formed by ring 38 and weld 40 by advancing the externally threaded end of an adapter, tubular extension member, or similar element (not shown) into the threaded portion of bore 34 into contact with seat 44.

Valve ball 30 is free to move axially within grooved bore 26 between valve seat 31 and shoulders 32. When ball 30 is in contact with the seat 31 the valve is in the closed position and fluid flow therethrough is prohibited. As the ball 30 moves upwardly relative to body 12 fluid commences to flow through the body, through the grooves 28.

Method of manufacture

For a step by step description of the method of manufacture of the valve cage of this invention in the above described preferred form, reference is now made to FIGURES 4 through 10.

The stock material from which this valve cage is produced is a tubular mandrel 50. A first bore 18 extends axially downwardly (from left to right to FIGURE 4) in mandrel 50 from the upper end 52 and terminates downwardly in a counterbore 20 of smaller diameter. Counter bore 20 terminates downwardly in an enlarged bore 26 forming a frusto-conical internal shoulder 54 at the point of juncture of the two coaxial bores 20 and 26. Bore 26 terminates downwardly in a still further enlarged coaxial bore 34 forming the internal annular shoulder 36 therebetween.

Alternatively, it should be noted that the stock material from which this cage is made can be a forging, casting or a solid metallic rod or bar in which case the first step of the manufacture of this cage will be the milling, boring or otherwise shaping of this rod to the external and internal configuration as above described.

The next step in the manufacture of the valve cage of this invention is the forming of inclined fluid by-pass grooves 28 and ball valve guide ribs 29 in bore 26. An appropriate milling tool of diameter less than the diameter of bore 26 is inserted through bore 34 to shoulder 36. The tool is oriented at an angle to the axis of mandrel 50 with the angle being preferably greater than 0° but not more than 20°. The first of the three grooves 28 is then milled in the internal surface of bore 26 upwardly to the point where bore 26 meets the bottom of shoulder 54. The tool is then withdrawn, the mandrel 50 is rotated 120°, the tool is repositioned and a second groove 28 similar to the first is milled in the manner just described with reference to the first groove. This procedure is repeated to form the third of the three grooves 28.

It should be noted that the internal longitudinally extending guide surfaces 29 are automatically formed by the milling out of the grooves 28. Further shaping of these surfaces is normally unnecessary.

The next step in the method of producing the valve cage of this invention consists of milling out the upper fluid by-pass grooves 22. An appropriate milling tool, similar to that used in forming grooves 28 but preferably having a smaller diameter, is extended through bore 18 to a point on shoulder 24 formed by the meeting of bore 18 and counter bore 20. The tool is then oriented at a downwardly and outwardly inclined angle with respect to the axis of counter bore 20 and a first of preferably three grooves 22 is then milled in the interiorly exposed surface of counterbore 20 to intersect with the upper end of one of the grooves 28. The tool is then repositioned 120° around the internal periphery of counterbore 20, as above described, and a second groove 22 is milled therein. This procedure is repeated once again to form the third of the three grooves 22. Ribs 23 are automatically formed between adjacent grooves 22 in the milling operation and further forming of these ribs is ordinarily unnecessary.

It should be noted that grooves 20 and 28 are correspondingly spaced in their respective bores, thereby providing three continuous fluid by-pass passages through the middle portion of the valve cage.

By forming the by-pass passages in the manner above described all adjacent surfaces meet in obtuse angles or shallow curves. Therefore, the valve cage of this invention is not subjected to failures commonly resulting from sharp angled junctions between interior surfaces.

Figure 9:
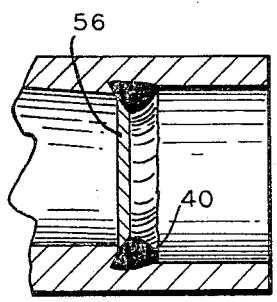
FIGURE 9 is a partial cross-sectional view of one end of the blank stock of FIGURE 4 after the third step of this method for producing closed valve cages has been completed.
Figure 4:
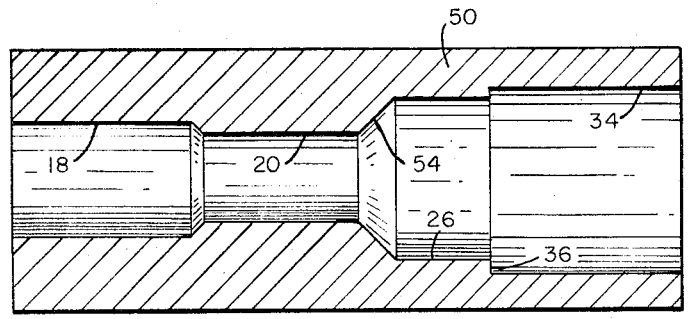
FIGURE 4 is a cross-sectional view of typical blank stock from which the valve cage of this invention is produced employing the method of this invention.
Figure 5:
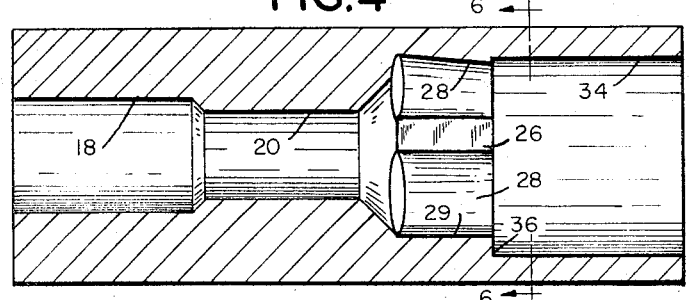
FIGURE 5 is a cross-sectional view of the blank stock of FIGURE 4, after the first step of this method for producing closed valve cages has been completed.
Figure 7:
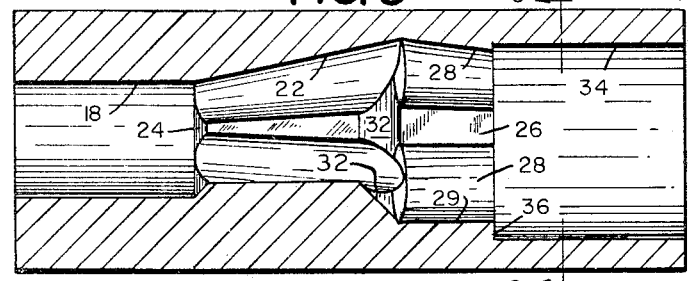
FIGURE 7 is a cross-sectional view of the blank stock of FIGURE 4 after the second step of this method for producing closed valve cages has been completed.
Figure 10:
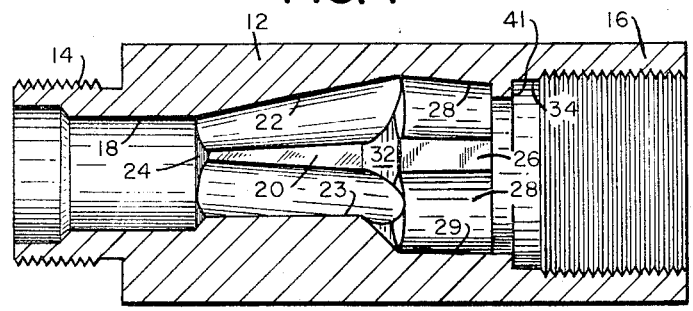
FIGURE 10 is a cross-sectional view of the closed valve cage of this invention made according to the method of this invention.

For a description of the next step in the method of producing the valve cage 10 of this invention, reference is now made to FIGURES 9 and 10. A substantially dish shaped disc 56 is inserted into the bore 34 into contact with shoulder 36 with the convex surface of disc 56 presented downwardly and outwardly of bore 34. Disc 56 is then radially expanded into tight fit with the interior periphery of bore 34, as for example by deforming the center portion of disc 56 upwardly relative to mandrel 50. An annular weld 40 is then applied to the periphery of the disc and the internal surface of bore 34 in the approximate vicinity of the periphery of the disc. During the welding operation the weld 40 and the peripheral edge portion of disc 56 become fused with the material of mandrel 50, adajcent the disc periphery, thereby becoming one material with the mandrel. It should be noted that during this welding operation disc 56 serves as a shield for the interior of the valve cage to prevent damage to the machined or otherwise finished surfaces by weld splatter or weld bead. After the weld 40 has been formed the central portion of the disc 56 is removed, as by machining and the remaining ring 56 and weld 40 are machined to produce a smoothly finished annular shoulder having substantially the same internal diameter as the diameter of bore 26. Bore 34 is then threaded internally and the upper end of mandrel 50 is provided with external threads 14 (as shown in the figures) or internal threads, as required.

The valve cage is then completed and is ready to receive within the grooved bore 26 a conventional valve ball 30, after which valve seat 31 of conventional design, such as a flat or rib type as known in the art, is positioned within bore 34, in contact with the shoulder produced by disc 56 and weld 40 which are now fused into one piece with body 12. An externally threaded adaptor or similar element (not shown) is then advanced into bore 34 to retain the valve seat within bore 34. The valve and valve cage are then assembled and ready for use.

It should be noted that although it is described as preferred that a dish shaped disc 56 and annular weld 40 be used to produce the shoulder against which the valve seat can be retained, it is contemplated that a flat disc or ring (not shown) machined to close tolerance to be press fitted into bore 34 can be used in place of dish shaped disc 56 or, alternately, the annular weld 40 can be used alone to produce this shoulder. The primary advantages in using disc 56 is the anti-splatter protection it affords the machined interior of the valve cage. With disc 56 positioned within the bore 34 no welding slag or similar material can splatter interiorly of the valve cage during the welding operation.

It should be noted that the relatively large, evenly spaced, arcuate fluid by-pass grooves 28 extending upwardly from the valve seat are sufficiently large to accommodate a relatively high fluid flow. By inclining grooves 28 upwardly and outwardly the area open to flow increases as the ball valve moves upwardly in cage 10, decreasing the speed of upward movement of the ball. Since by-pass grooves 22 and 28 are arcuate in transverse cross section instead of square or V-shaped there are no sharp lines of juncture of adjacent interior surfaces of cage 10 which would be subject to high pressure or fatigue failure.

The method used in producing this valve cage is relatively simple and does not require the use of special or expensive milling equipment. The shoulder against which the valve seat is retained is easily produced, is very strong, and this method of producing it is not at all injurious to the remainder of the valve cage.

Also, since this shoulder is in its preferred form the product of welding a separate element (the disc 56) to the cage, it can be produced as a hard seat surface while the remainder of the cage body is relatively soft and ductile by the proper selecton of disc metal and weld metal. Of course, the reverse condition of hard cage body and soft valve seat shoulder is also possible by proper selection of disc and weld metal. Also, the use of corrosion resistant weld metal, such as stainless steel, can be used to greatly increase the corrosion resistance of this shoulder although the cage body is of less corrosion resistant material.

The shoulders 32 that limit the upward movement of the ball valve are relatively small in area and are evenly spaced so that they will not materially effect fluid flow through the valve cage yet will provide even and uniform support for the valve ball.

The invention has been described by reference to specific and preferred embodiments. It will be apparent, however, that many modifications can be made without departing from the spirit and scope of the invention. For example, grooves as described herein as arcuate in transverse cross section is not to be held as limiting as other groove configurations can be used. Accordingly, this invention should be construed not to be limited to the embodiment herein described but should be limited only by the scope of the appended claims.

What is claimed:
1. A unibody closed valve cage comprising
   a lower valve ball receiving portion having a bore extending axially therethrough;
   an upper portion having at least one flow passage extending therethrough, said flow passage being smaller in diameter than and communicating at its lower end with the upper end of said bore through said lower portion;
   at least one longitudinally extending groove open to said bore and provided in the interiorly exposed surface of said lower portion, terminating upwardly at the point of juncture of said bore through said lower portion and said bore through said upper portion, and terminating downwardly in an internal annular shoulder for receiving thereagainst a ball valve seat, the axis of said groove in said lower portion inclining upwardly and outwardly with respect to the axis of said bore through said lower portion;
   at least one longitudinally extending valve ball guide surface provided interiorly of said lower portion;
   a downwardly presented valve ball stop means provided at the juncture of said flow passage and said bore through said lower portion.

2. A unibody closed valve cage according to claim 1, wherein the angle of inclination of the axis of said groove in said lower portion is greater than 0° but not more than 20° with respect to the axis of said bore through said lower portion.

3. A unibody closed valve cage for a ball valve comprising
   an upper portion having a fluted axial bore therein, said fluted bore terminating downwardly in a downwardly presented valve ball stop means;
   a lower portion having a valve ball receiving chamber therein, said chamber in communication at its upper end with the lower end of said fluted bore and provided in the wall thereof with at least one longitudinally extending groove having an arcuate transverse cross section open into said chamber, and at least one adjacent valve ball guide surface, said groove being inclined upwardly and outwardly with respect to the axis of said chamber and intersecting at its upper end with the lower end of one of the flutes in said upper portion, an internal annular shoulder provided within the lower most end of said chamber for receiving against the downwardly presented side thereof an annular ball valve seat;

means on the upper and lower ends of said cage for connecting said cage into a fluid flow system.

4. A unibody closed valve cage according to claim 3, wherein said groove inclines at an angle of greater than 0° but not more than 20° with respect to the axis of said chamber.

5. A unibody closed valve cage comprising a lower valve ball receiving portion having a first bore extending axially therethrough terminating at its lower end with an annular first shoulder for receiving thereagainst an annular ball valve seat, an upper portion having a bore extending therethrough, coaxially communicating with and smaller in diameter than said bore through said lower portion, said bore through said lower portion and said bore through said upper portion meeting in an annular downwardly and outwardly sloping second shoulder;

a plurality of longitudinally extending first grooves, arcuate in transverse cross section, in annularly spaced relation in the interiorly exposed surface of said lower portion, said grooves terminating upwardly at the bottom of second shoulder, the axes of said first grooves being inclined upwardly and outwardly with respect to the axis of said first bore;

a plurality of longitudinally extending valve ball guide surfaces formed one each between adjacent first grooves in said lower portion;

a plurality of longitudinaly extending second grooves, arcuate in transverse cross section, in the interiorly exposed surface of said upper portion, said second grooves extending downwardly and outwardly through said second shoulder with the bottom ends of said second grooves coinciding with the top ends of said first grooves, means on the upper and lower ends of said cage for connecting said cage to a fluid flow system.

6. A unibody closed valve cage according to claim 5, wherein the angle of inclination of the axes of said first grooves is greater than 0° but not more than 20° with respect to the axis of said first bore.

7. A unibody closed valve cage comprising an upper portion having a central bore therethrough, said bore terminating at its lower end with a downwardly presented valve ball stop means;

a lower portion having a bore-like valve ball receiving chamber therein, said chamber in communication at its upper end with the lower end of said bore and terminating at its lower end with an annular shoulder for receiving thereagainst an annular ball valve seat;

a plurality of longitudinally extending equally annularly spaced first grooves, having arcuate transverse cross section, are provided in the interior wall of said chamber, said first grooves being inclined upwardly and outwardly with respect to the axis of said chamber;

a plurality of longitudinally extending ball valve guide surfaces formed one each between adjacent first grooves in said chamber.

a plurality of annularly spaced longitudinally extending second grooves are provided in the wall of said bore through said upper portion, said second grooves being inclined downwardly and outwardly with respect to the axis of said bore and intersecting at their lower ends with the upper ends of said first grooves;

separate means on the upper end and on the lower end of said cage for connecting said cage into a fluid flow system.

8. A unibody closed valve cage according to claim 7, wherein the angle of inclination of said first grooves is greater than 0° but not more than 20°, with respect to the axis of said chamber.

9. A method of making a unibody closed valve cage commencing with a mandrel having a flow passage extending axially downwardly through the upper portion thereof terminating downwardly in a valve ball stop means, said method comprising the steps of forming a ball valve receiving bore in the lower portion of said mandrel terminating upwardly in said ball stop means and communicating upwardly with the lower end of said flow passage;

forming at least one longitudinally extending groove in the the wall of said bore and open thereto, thereby forming at least one longitudinally extending valve ball guide surface adjacent said groove, said groove inclining upwardly and outwardly with respect to the axis of said bore with its upper end communicating with said flow passage, through said stop means; and thereafter forming an annular shoulder internally and smaller in diameter of said bore, adjacent the bottom end of said groove, for receiving thereagainst an annular valve ball seat.

10. A method of making a unibody closed valve cage commencing with a mandrel having a flow passage extending axially downwardly through the upper portion thereof terminating downwardly in a valve ball stop means, said method comprising the steps of forming an axial first bore in the bottom portion of said body;

forming an axial second bore in the intermediate portion of said body, said second bore being of smaller diameter than and coaxially communicating downwardly with said first bore and terminating upwardly in said valve ball stop means, the upper end of said second bore communicating with the bottom end of said flow passage;

forming at least one longitudinally extending groove, having arcuate transverse cross section, in the wall of said second bore and open thereto, thereby forming at least one longitudinally extending valve ball guide surface adjacent said groove, said groove inclining upwardly and outwardly at an angle greater than 0° but not more than 20° with respect to the axis of said second bore with its upper end communicating with the lower end of said flow passage;

forming an internal annular shoulder subadjacent to and in contact with the shoulder formed by the junction of said first bore and said second bore for receiving thereagainst an annular valve ball seat;

providing separate means on the upper and lower ends of said body for connecting said cage into a fluid flow system.

11. A method of making a closed valve according to claim 10, wherein said annular shoulder is formed by applying an annular weld internally of said first bore, adjacent the point of junction of said first bore with said second bore;

finishing said annular weld to provide a smooth surfaced annular shoulder in said first bore.

12. A method of making a closed valve cage from a one-piece mandrel comprising the steps of forming a first bore through the bottom end portion of said mandrel;

forming a second bore through the lower intermediate portion of said mandrel coaxial with and in communication with said first bore;

forming a third bore through the upper portion of said mandrel coaxial with and in communication with said second bore, said bores being progressively smaller diameter from said first bore through said third bore;

forming at least one longitudinally extending first groove, having arcuate transverse cross section, in the wall of said second bore and open thereto, said groove inclining upwardly and outwardly at an angle greater than 0° but not more than 20° with respect to the axis of said second bore;

forming at least one longitudinally extending second groove in said third bore, said groove inclining downwardly and outwardly with respect to the axis of said third groove and terminating downwardly in the upper end of said first groove;

forming an internal annular shoulder in said first bore, subadjacent the shoulder produced by the junction of said first and said second bores, for receiving thereagainst an annular ball valve seat;

providing separate means on the upper and lower ends of said body for connecting said cage into a fluid flow system.

13. A method of making a closed valve cage from a one-piece body comprising the steps of forming a first bore axially through the lower portion of said body;

forming a second bore axially through the intermediate portion of said body, terminating downwardly coaxially with the upper end of said first bore;

forming a third bore through the upper portion of said body, terminating downwardly coaxially with the upper end of said second bore, said bores being progressively smaller in diameter from said first bore through said third bore with said second bore and said third bore meeting in a frusto-conical shaped shoulder;

forming a plurality of equally angularly spaced longitudinally extending first grooves, having arcuate transverse cross section, in the wall of said second bore and open thereto, thereby forming longitudinally extending ball valve guide surfaces between adjacent first grooves, said first grooves inclining upwardly and outwardly at an angle greater than 0° but not more than 20° with respect to the axis of said second bore;

forming a plurality of equally angularly spaced longitudinally extending second grooves, having arcuate transverse cross section, in the wall of said third bore, said second grooves inclining downwardly and outwardly with respect to the axis of said third bore and extending through said frusto-conical shoulder, terminating downwardly in the upper ends of said first grooves;

forming an internal annular shoulder at the point of juncture of said first bore and said second bore for receiving thereagainst an annular valve ball seat;

providing means on the upper and lower ends of said body for connecting said cage into a fluid flow system:

14. A unibody closed valve cage comprising a lower valve ball receiving portion having a bore extending axially therethrough;

an upper portion having at least one flow passage extending therethrough, said flow passage communicating at its lower end with the upper end of said bore through said lower portion;

at least one longitudinally extending groove, open to said bore and provided in the interiorly exposed surface of said lower portion, terminating upwardly at the point of juncture of said bore through said lower portion and said bore through said upper portion, and terminating downwardly in an internal annular shoulder for receiving thereagainst a ball valve seat, the axis of said groove in said lower portion inclining upwardly and outwardly with respect to the axis of said bore through said lower portion;

at least one longitudinally extending valve ball guide surface provided interiorly of said lower portion; and a downwardly presented valve ball stop means provided at the juncture of said flow passage and said bore through said lower portion.

15. A method of making a unibody closed valve cage commencing with a mandrel having a flow passage extending axially downwardly through the upper portion thereof terminating downwardly in a valve ball stop means, said method comprising the steps of forming a ball valve receiving bore in the lower portion of said mandrel terminating upwardly in said ball stop means and communicating upwardly with the lower end of said flow passage;

forming at least one longitudinally extending groove in the wall of said bore, thereby forming at least one longitudinally extending valve ball guide surface adjacent said groove, said groove inclining upwardly and outwardly with respect to the axis of said bore with its upper end communicating with said flow passage, through said stop means; and thereafter forming an annular shoulder internally of said bore, adjacent the bottom end of said groove, for receiving thereagainst an annular valve ball seat, wherein said shoulder is formed by positioning a substantially flat metallic element having a round external periphery interiorly of said bore, near the bottom end thereof and below the bottom end of said groove; applying an annular weld to the peripheral area of the downwardly exposed surface of said element and the adjacent interior surface of said bore; and finishing said element of said weld to produce a smooth surfaced annular shoulder interiorly of said bore.

16. A method of making a unibody closed valve cage commencing with a mandrel having a flow passage extending axially downwardly through the upper portion thereof terminating downwardly in a valve ball stop means, said method comprising the steps of forming an axial first bore in the bottom portion of said body;

forming an axial second bore in the intermediate portion of said body, said second bore being of smaller diameter than and coaxially communicating downwardly with said first bore and terminating upwardly in said valve ball stop means, the upper end of said second bore communicating with the bottom end of said flow passage;

forming at least one longitudinally extending groove, having arcuate transverse cross section, in the wall of said second bore, thereby forming at least one longitudinally extending valve ball guide surface adjacent said groove, said groove inclining upwardly and outwardly at an angle greater than 0° but not more than 20° with respect to the axis of the second bore with its upper end communicating with the lower end of said flow passage;

forming an internal annular shoulder subadjacent to and in contact with the shoulder formed by the junction of said first bore and said second bore for receiving thereagainst an annular valve ball seat;

providing separate means on the upper and lower ends of said body for connecting said cage into a fluid flow system, wherein said annular shoulder is formed by positioning a metallic disc subadjacent the shoulder formed by the junction of said first bore and said second bore;

expanding said disc radially into tight fit with the adjacent internal surface of said first bore;

applying an annular weld to the peripheral area of the downwardly presented surface of said disc and the surrounding adjacent internal surface of said firsts bore;

removing the central portion from said disc; and finishing the remaining annular ring-shaped portion of said disc and said annular weld to provide a smooth surfaced annular shoulder in said first bore for receiving thereagainst an annular valve ball seat.

17. A method of making a unibody closed valve cage commencing with a mandrel having a flow passage extending axially downwardly through the upper portion thereof terminating downwardly in a valve ball stop means, said method comprising the steps of forming an axial first bore in the bottom portion of said body;

forming an axial second bore in the intermediate portion of said body, said second bore being of smaller diameter than and coaxially communicating downwardly with said first bore and terminating upwardly in said valve ball stop means, the upper end of said second bore communicating with the bottom end of said flow passage;

forming at least one longitudinally extending groove, having arcuate transverse cross section, in the wall of said second bore, thereby forming at least one longitudinally extending valve ball guide surface adjacent said groove, said groove inclining upwardly and outwardly at an angle greater than 0° but not more than 20° with respect to the axis of said second bore with its upper end communicating with the lower end of said flow passage;

forming an internal annular shoulder subadjacent to and in contact with the shoulder formed by the junction of said first bore and said second bore for receiving thereagainst an annular valve ball seat;

providing separate means on the upper and lower ends of said body for connecting said cage into a fluid flow system, wherein said annular shoulder is formed by positioning a metallic ring subadjacent the shoulder formed by the juncture of said first bore and said second bore, applying an annular weld to the external peripheral area of the downwardly presented surface of said ring and the surrounding adjacent internal surface of said first bore, and finishing said ring and said annular weld to provide a smooth surfaced annular shoulder interiorly of said first bore for receiving thereagainst an annular valve ball seat.

References Cited by the Examiner

UNITED STATES PATENTS

| | | | |
|---|---|---|---|
| 1,714,398 | 5/1929 | O'Bannon | 29—157.1 X |
| 1,870,970 | 8/1932 | Stevenson | 29—157.1 |
| 2,192,670 | 3/1940 | Adkins | 137—515 |
| 2,216,092 | 9/1940 | Northon | 137—516.13 X |
| 2,341,006 | 2/1944 | Wissler et al. | 29—157.1 |
| 2,602,631 | 7/1952 | Eickmeyer | 132—515.5 |
| 2,869,221 | 1/1959 | Siepmann | 29—157.1 |
| 2,896,905 | 7/1959 | Stehlin | 251—366 |
| 2,903,236 | 9/1959 | Holycross | 251—366 |
| 3,052,013 | 9/1962 | Kane | 29—157.1 |

M. CARY NELSON, *Primary Examiner.*

S. SCOTT, *Assistant Examiner.*